United States Patent
Krebs

(10) Patent No.: US 9,518,801 B2
(45) Date of Patent: Dec. 13, 2016

(54) HAND GUARD AND BARREL CLAMP

(71) Applicant: Marc Krebs, Glenview, IL (US)

(72) Inventor: Marc Krebs, Glenview, IL (US)

( * ) Notice: Subject to any disclaimer, the term of this patent is extended or adjusted under 35 U.S.C. 154(b) by 172 days.

(21) Appl. No.: 14/148,487

(22) Filed: Jan. 6, 2014

(65) Prior Publication Data
US 2015/0192385 A1 Jul. 9, 2015

(51) Int. Cl.
*F41C 23/00* (2006.01)
*F41C 23/16* (2006.01)

(52) U.S. Cl.
CPC .......... *F41C 23/16* (2013.01); *Y10T 24/44641* (2015.01)

(58) Field of Classification Search
CPC ....................................................... F41C 23/16
USPC ............................................ 42/71.01, 75.03
See application file for complete search history.

(56) References Cited

U.S. PATENT DOCUMENTS

| 7,793,452 B1* | 9/2010 | Samson | F41C 23/16 42/71.01 |
| 8,316,574 B1* | 11/2012 | Swan | F41C 23/16 42/146 |
| 8,863,426 B1* | 10/2014 | Zinsner | F41C 23/16 42/71.01 |

FOREIGN PATENT DOCUMENTS

EP  2 653 824 A2  10/2013

* cited by examiner

*Primary Examiner* — J. Woodrow Eldred
(74) *Attorney, Agent, or Firm* — Fitch, Even, Tabin & Flannery, LLP

(57) ABSTRACT

A hand guard is provided for a firearm, such as a rifle, and may be suitable for maintaining the alignment of the hand guard, and any accessories coupled thereto, relative to the rifle. The hand guard may be configured so that at least a portion of the hand guard can be removed from the firearm and then re-installed on the firearm without significant change in the orientation and position of the hand guard. The hand guard may also be suitable for coupling accessories such as lights, scopes, laser sights, and other firearm accessories to the firearm.

18 Claims, 12 Drawing Sheets

HAND GUARD AND BARREL CLAMP

FIELD OF THE INVENTION

The present application relates to components used with firearms and, more particularly, to hand guards and barrel clamps used on firearms, such as rifles.

BACKGROUND OF THE INVENTION

Firearms, such as rifles, oftentimes include a hand guard so a user can readily grasp the firearm effectively. For example, the user may need to grasp the firearm for carrying, transport, and firing of the weapon. Such a hand guard may be especially useful with longer firearms such as rifles. The hand guard should also be generally designed to accommodate for any recoil produced by the weapon during use.

Furthermore, hand guards may oftentimes be used for affixing accessories, such as lights, laser sights, scopes and other accessories to the firearm. In this regard, the hand guard may include a plurality of connection points, such as openings, for receiving accessories and/or accessory mounts for coupling one or more accessories to the firearm.

However, prior hand guards oftentimes suffer from a number of deficiencies. For example, hand guards, or at least a portion thereof, may need to be removed to permit cleaning, disassembly, and/or removal of parts of the firearm. Many prior hand guards involved complicated mechanisms for coupling and uncoupling portions of the hand guard to a firearm. Further, tools and small parts are also oftentimes used in prior hand guards to assemble the hand guard. In this regard, such hand guards may be more difficult to remove in the field as tools may not be readily available and/or small parts and fasteners may be easily lost. For example, some firearms include gas tubes that may need to be removed or serviced in the field, thereby requiring removal of at least a portion of the hand guard. However, prior hand guards may not be entirely suitable for field servicing, such as of gas tubes, because of the complicated mechanisms and small parts that may be easily lost in the field.

Additionally, as noted above, many hand guards also include connections for coupling accessories to the hand guard and ultimately, the firearm. However, when portions of the hand guard are removed, along with the accessories, it is possible for certain accessories, such as scopes and laser sights, to lose their alignment or otherwise "lose their zero." This can be especially noticeable on longer weapons where minor changes in the orientation of the hand guard may significantly affect the alignment of any attached accessories.

SUMMARY OF THE INVENTION

In one form, a hand guard is provided for a firearm, such as a rifle, and may be suitable for maintaining the alignment of the hand guard, and any accessories coupled thereto, relative to the rifle. For example, the hand guard may be configured so that at least a portion of the hand guard can be removed from the firearm and then re-installed on the firearm without significant change in the orientation and position of the hand guard once installed. The hand guard may be especially suitable for longer guns, such as rifles, whereby the hand guard may be used to carry and/or hold the firearm during use. The hand guard may also be suitable for coupling accessories such as lights, scopes, laser sights, and other firearm accessories to the firearm. In another form, a plurality of accessories may be coupled to the hand guard at various positions on the hand guard.

According to one form, at least a portion of the hand guard may be readily removable without requiring tools or external fasteners. For example, an upper part of the hand guard may be removable relative to a lower part of the hand guard by manipulating a locking structure and sliding the upper part relative to the lower part. In one form, the lower part may be maintained on the firearm and serve as a reference for repositioning the upper part. The upper part may then be re-installed on the firearm via the lower part by manipulating the locking structure and then sliding the upper part relative to the lower part. The locking structure may cooperate with other structure on the hand guard to maintain the upper and lower parts on the firearm via a friction fit. As the lower part may be maintained on the firearm and the upper part is positionable on the lower part in a specific configuration, the upper and lower parts may be maintained substantially in alignment as established during the initial installation on the firearm. This may be significant as accessories may be coupled to the hand guard such that the alignment and/or "zero" of the accessories may be substantially maintained, even after removal and re-installation of a portion of the hand guard.

In accordance with one form, a hand guard includes an elongated housing including an upper part, a lower part and a locking structure. The upper and lower parts may be positioned to define an interior space when installed. The upper and lower parts may also be separable from one another without the need for tools or external fasteners. One of the upper and lower parts may include an interior portion with a first dimension that is sized to be received within the other of the upper and lower parts at an exterior portion having a second dimension larger than the first dimension. In one form, the upper part includes lower wall portions that are sized to fit within outer wall portions of the lower part.

In one form, at least one of the upper and lower parts including a protrusion extending toward the interior portion while the other of the upper and lower parts defines a slot configured to accept the protrusion. For example, the lower part may include a plurality of protrusions, such as posts, that extend inwardly toward an interior portion of the housing while the upper portion includes a plurality of slots configured to cooperate with the protrusions.

According to one form, the locking structure abuts the interior portion and cooperates with the protrusion and slot to limit movement of the upper and lower parts relative to one another when in an installed configuration. For example, the slot may be configured to permit the protrusion to slide through a portion of the slot and then abut an end portion of the slot, providing a force in a first direction while the locking structure abuts the interior portion and provides a force in an opposite direction. Therefore, in one form, the upper and lower parts may be maintained relative to one another via a friction-type fit.

In another form, a hand guard includes an elongated housing including an upper part, a lower part and a front securing structure. The upper and lower parts may be positioned to define an interior space when installed. The lower part has a lower exterior surface extending along a lower plane. The upper part has an upper exterior surface extending along an upper plane with the upper and lower planes being configured at an angle relative to one another so the upper and lower planes are not parallel. One of the upper and lower parts has an interior portion with a first dimension that is sized to be received within the other of the upper and lower parts at an exterior portion having a second dimension larger than the first dimension.

In one form, the locking structure is movable to an unlocked position thereby permitting the upper and lower parts to move relative to one another and disengage the protrusion from the slot.

In another form, a barrel clamp may also be provided. The barrel clamp may be used with a hand guard or other structure to secure the structure relative to the firearm. The barrel clamp includes a barrel engaging portion, a first housing engaging portion and a second housing engaging portion. The first housing engaging portion includes a first partially threaded portion and the second housing engaging portion includes a second partially threaded portion. The barrel engaging portion extends between the first housing engaging portion and the second housing engaging portion. The first and second housing engaging portions are movable between an open configuration and an installed configuration. For example, in the open configuration, the first and second housing engaging portions are separated from one another to permit a barrel of the firearm to be moved between the first and second housing engaging portions and positioned adjacent the barrel engaging portion. In the installed configuration, the first and second housing engaging portions are positioned adjacent one another such that the first and second partially threaded portions define a threaded opening extending in a first direction for receiving a fastener. The barrel engaging portion is at least substantially surrounding a circumference of a barrel of the firearm when in an installed configuration.

According to one form, the hand guard further includes a first channel positioned at a wall of the exterior portion configured to receive a wall of the interior portion and a second channel positioned at an opposing wall of the exterior portion configured to receive an opposing wall of the interior portion, the first and second channels defining the second dimension.

In one form, the locking structure includes a first spring positioned at the first channel and a second spring positioned at the second channel, and the first and second springs deflect towards the interior space to permit the interior portion to be secured within the exterior portion.

In accordance with one form, the exterior portion includes a plurality of protrusions and the interior portion includes a plurality of slots configured to receive the plurality of protrusions.

In one form, the slot is generally L-shaped to receive the protrusion and permit the upper and lower portions to move in a plurality of directions relative to one another.

According to one form, the locking structure includes at least one spring that deflects towards the interior space in the unlocked position.

In accordance with one form, at least one of the upper and lower parts includes a plurality of external openings configured to receive and secure at least one firearm accessory.

In one form, the first housing engaging portion includes an upper portion having a first plurality of aligned teeth and the second housing engaging portion includes an upper portion having a second plurality of aligned teeth, the first and second plurality of aligned teeth being in alignment with one another when the first and second housing engaging portions are positioned adjacent one another.

According to one form, the barrel clamp further includes a first opening extending through the first housing engaging portion and a second opening extending through the second housing engaging portion, the first and second openings aligning with one another when the first and second openings are positioned adjacent one another to permit a fastener to pass therethrough in a direction that is substantially parallel to the first direction of the threaded opening.

In one form, the lower part includes a forward surface that extends along a forward plane such that the front plane is not perpendicular to either of the upper and lower planes.

BRIEF DESCRIPTION OF THE DRAWINGS

FIG. 6A is a perspective view of the barrel clamp of FIG. 6 when configured in an installed position;

DETAILED DESCRIPTION

Figure 1:
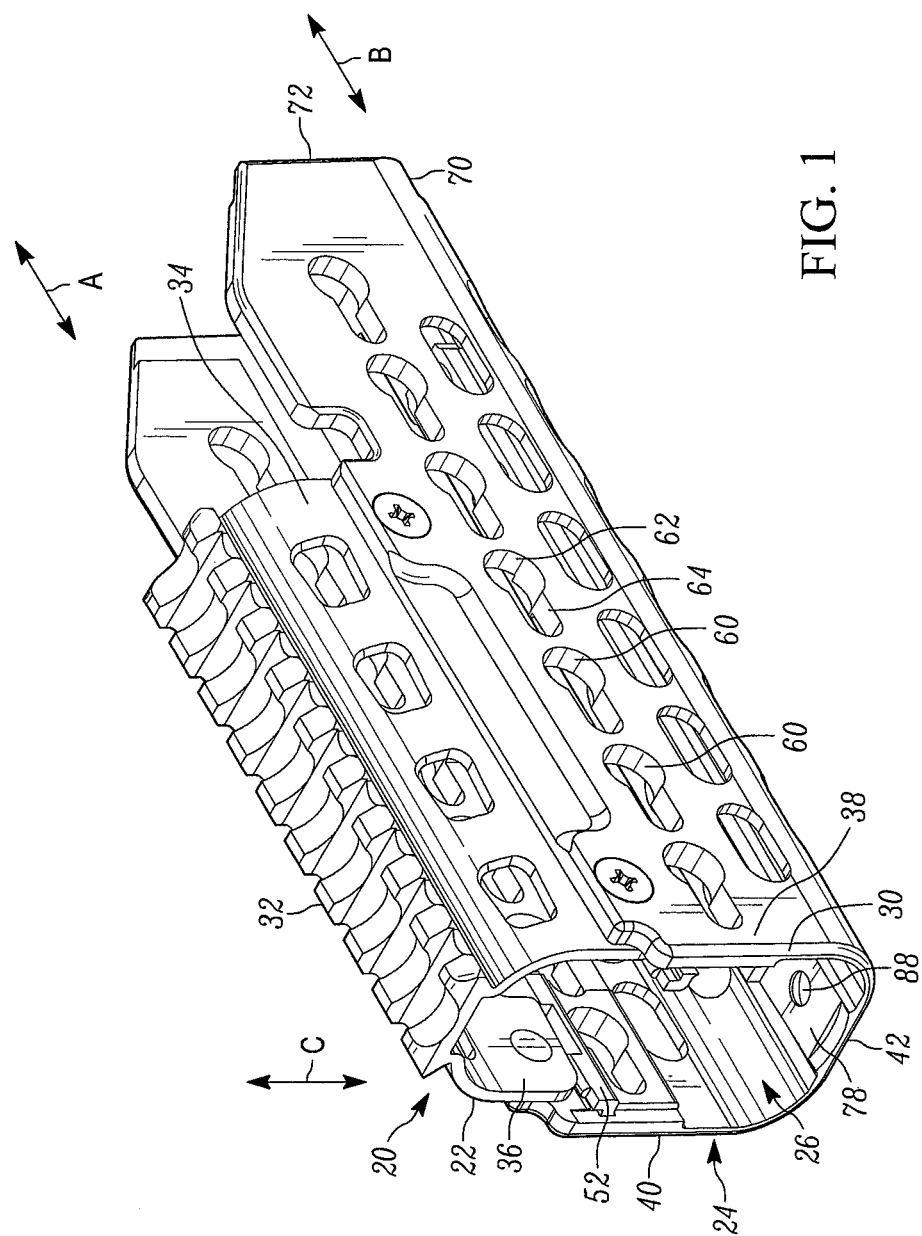
FIG. 1 is a perspective view of one form of a hand guard for a firearm.

Various forms and components of firearm hand guards and rails are provided and described herein. Referring to FIG. 1, one form of a hand guard 20 is shown. In this form, the hand guard 20 generally includes an upper part 22 and a lower part 24 with the upper and lower parts 22,24 defining an interior space 26 such that the upper and lower parts 22,24 generally surround a barrel of a firearm, when installed.

The hand guard 20 may also include a front securing structure 28 for securing a front portion 30 of the hand guard 20 to a firearm. In one form, as shown in FIG. 1, the hand guard 20 includes a rail interface 32 positioned on the upper part 22. The rail interface 32 may take a variety of forms, such as a dovetail shape, as shown in FIG. 1, whereby accessories, such as a scope, may be positioned and secured thereon.

In one form, the upper part 22 includes sidewalls 34,36 that extend downwardly from the rail interface 32 while the lower part 24 includes sidewalls 38,40 that extend upwardly from a lower exterior surface 42. In one form, the sidewalls 34,36 are separated by a dimension such that they fit within at least a portion of the dimension between sidewalls 38,40, such as shown in FIG. 1.

The upper and lower parts 22,24 may also include securing structure, such as openings 43,44 in lower part 24 and openings 46,48 in upper part 22. When the upper part 22 is installed with the lower part 24, the openings may be positioned such that fasteners, such as screws 50 may be positioned through the openings 43,44 and into openings 46,48. In this regard, in one form, the openings 46,48 may be threaded to receive the fasteners. The lower part 24 may also include one or more flanges 52 for contacting the upper part 22 and/or guiding the upper part into position during installation.

It should be appreciated that while the upper part 22 is shown as being positioned within the lower part 24, the hand guard 20 may also be configured such that the lower part 24 is positioned within the upper part 22. Similarly, the upper and lower parts 22,24 may include any number of different openings and/or structures for securing the upper and lower parts 22,24 relative to one another.

Figure 2:
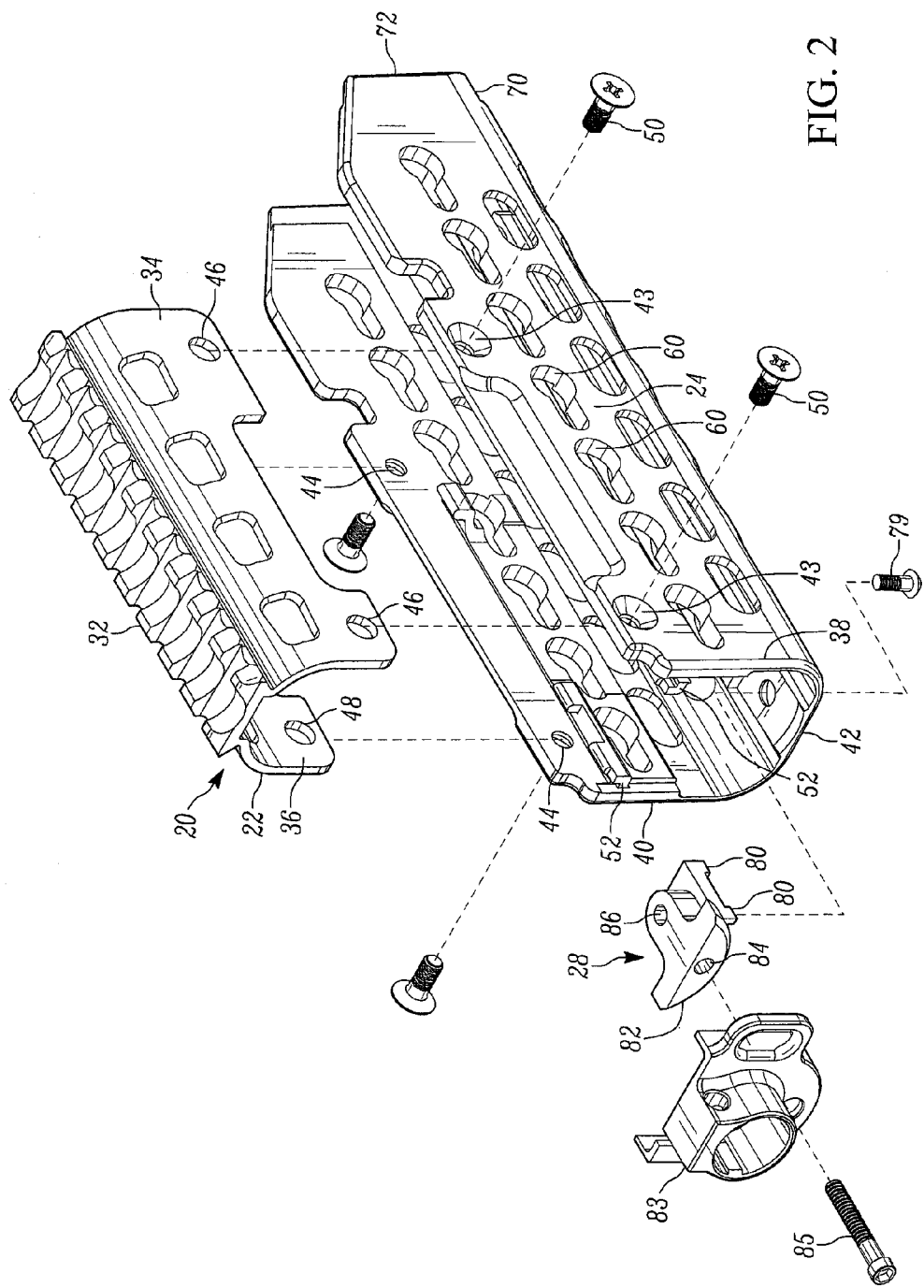
FIG. 2 is an exploded view of one form of a hand guard for a firearm.

Either and/or both of the upper and lower parts 22,24 may include structures for attaching accessories to the hand guard 20 and firearm. For example, as shown in FIGS. 1 and 2, the lower part 24 includes generally key-shaped openings 60 for receiving accessories and/or accessory mounts. Such key shaped openings 60 include an enlarged portion 62 and a slot portion 64. In one form, the slot portion 64 is generally beveled to receive a beveled portion from an accessory. In this regard, the accessory may include an enlarged portion extending from a beveled portion such that the enlarged portion of the accessory is inserted through the enlarged portion 62 and then slid through the slot portion 64. Thereafter, the accessory may be tightened as the beveled portions of the accessory and the slot portion 64 contact one another to secure the accessory. Such a key-shaped opening 60 and accessory mount may be found on products from Noveske and/or Vltor. Other forms of openings, mounts and fastening systems are also contemplated as would be acceptable for use with a hand guard for a firearm.

Figure 3:
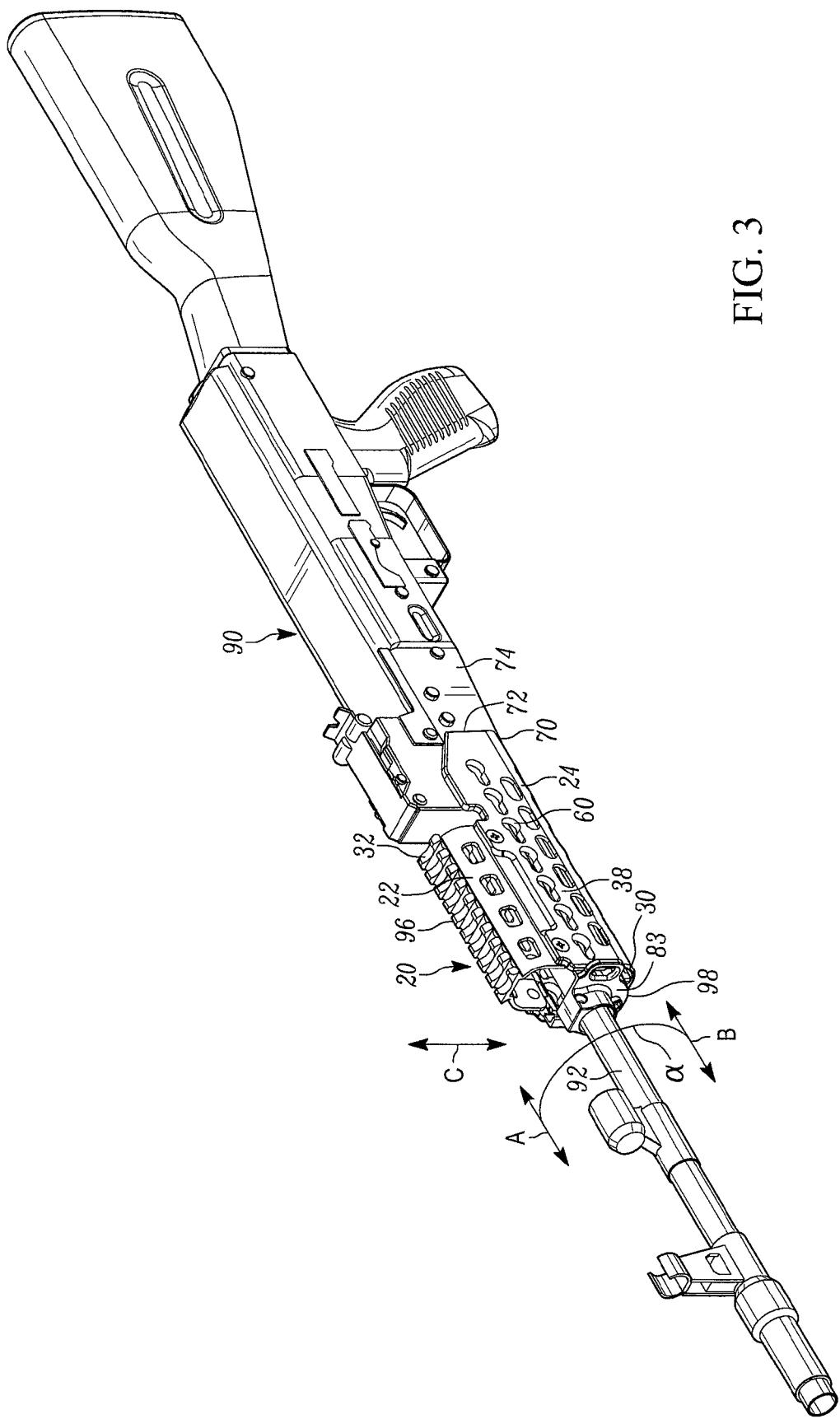
FIG. 3 is a perspective view of one form of a hand guard installed on a firearm.

The hand guard 20 also includes a slot 70 positioned at a rear portion 72 of the hand guard 20. In one form, the slot 70 is positioned in the lower part 24 and is configured to cooperate with a structure, such as a flange (not shown) on a receiver 74 of a firearm 76, such as shown in FIG. 3. Such a flange is generally known by those skilled in the art and understood as used on the receiver 74 of a firearm 76. In this form, the rear portion 72 is supported by the receiver 74 of the firearm. Other mounting structures may also be used. Similarly, the slot 70 and flange can be reversed on the hand guard 20 and firearm.

As noted previously, the hand guard 20 may also include a securing structure 28 which may be removable from or permanently secured to the hand guard 20. As shown in FIG. 2, the securing structure 28 is removably secured to the lower part 24, such as at mounting portion 78. In this form, the securing structure 28 may be fastened to the lower part 24 at the mounting portion 78 via one or more fasteners 79. The securing structure 28 and the mounting portion 78 may be configured such that the two mate with one another or otherwise cooperate to minimize movement of the securing structure 28 when installed. For example, the securing structure 28 may include legs 80 that extend over the mounting portion 78 to minimize side-to-side movement of the securing structure 28.

The securing structure 28 also includes a generally arc-shaped portion 82 that is configured to cooperate with a barrel clamp or other mounting structure, such as shown at 83, on a firearm to secure the hand guard 20 to the firearm, such as will be described in more detail below. The arc-shaped portion 82 includes an opening 84 that is configured to receive a fastener 85 therein extending from the barrel clamp or other structure 83 on the firearm. Further, the securing structure 28 includes an opening 86 that is configured to align with an opening 88 in the hand guard 20 to secure the securing structure 28 thereto.

The hand guard 20 may be installed on a firearm, such as firearm 90 by having the upper part 22 initially separated from the lower part 24. For example, the upper and lower parts 22,24 may be separated as shown in FIG. 2. By having the upper and lower parts 22,24 separated, the hand guard 20 may be easily positioned about the firearm 90 as well as permit other structures, such as a firearm gas tube, to be positioned on the firearm. The lower part 24 may then be positioned around a barrel 92 of the firearm with the slot 70 being slid into alignment with the receiver 74. Next, the mounting structure 83 may be slid into position adjacent the securing structure 28, which was previously mounted to the hand guard 20. The mounting structure 83 is then secured to the hand guard 20 to maintain the lower part 24 in a desired position. Next, the gas tube (not shown), or other structures may be installed on the firearm 90. Finally, the upper part 22 may be positioned on the lower part 24 and then secured thereto via fasteners or screws 50. Once installed, the hand guard 20 may be used to mount accessories, scopes and the like to the firearm.

When installed, the upper part 22 and lower part 24 may be positioned and configured to be securely mounted on a firearm to maintain the positioning of any scopes or other structures mounted to the hand guard 20, otherwise understood as maintaining the "zero" of the structures. The zero may be maintained during use and transportation of the firearm. Further, the upper part 22 may be removed, such as for cleaning and/or maintenance of the firearm, such as of the gas tube, and then reinstalled to substantially maintain the zero of the scopes or accessories. In other words, the upper and lower parts 22,24 may be quickly and easily returned to their installed and calibrated positions relative to one another after reinstallation.

Further, it should be noted that the upper and lower parts 22,24 may be positioned relative to one another to help maintain the relative positions of one another or otherwise increase the ease of installation. For example, when installed, the upper part 22 may have an upper exterior surface 96 that extends along an upper plane, such as represented at line A, while the lower part includes a lower exterior surface 98 extending along a lower plane, represented at line B. In one form, the upper and lower planes A,B are configured to be at an angle relative to one another such that they are not parallel. For example, the upper and lower planes A,B are positioned at an angle $\alpha$ relative to one another. In one form, the angle $\alpha$ is 1 degree and provides a slight lean back of the upper and lower parts 22,24. Other angles are also contemplated including, but not limited to 2, 3, 4, 5, 6, 7, 8, 9, 10, 11, 12, 13, 14, and 15 degrees and the like. This may help guide or otherwise maintain the positions of the structures of the hand guard 20.

Similarly, the front portion 30 of the hand guard 20 may be positioned at an angle relative to other portions of the hand guard 20. In one form, the front portion 30 extends along a plane, represented by line C, such that the front portion 30 is not perpendicular to either of the planes A or B. In this regard, the front portion 30 may extend at an angle of 91 degrees relative to plane B to help maintain the zero or otherwise assist in installation of the hand guard, such as when coupling to mounting structure 83. Other angles are also contemplated including, but not limited to 80, 81, 82, 83, 84, 85, 86, 87, 88, 92, 93, 94, 95, 96, 97, 98, 99, and 100 degrees and the like.

Figure 4:
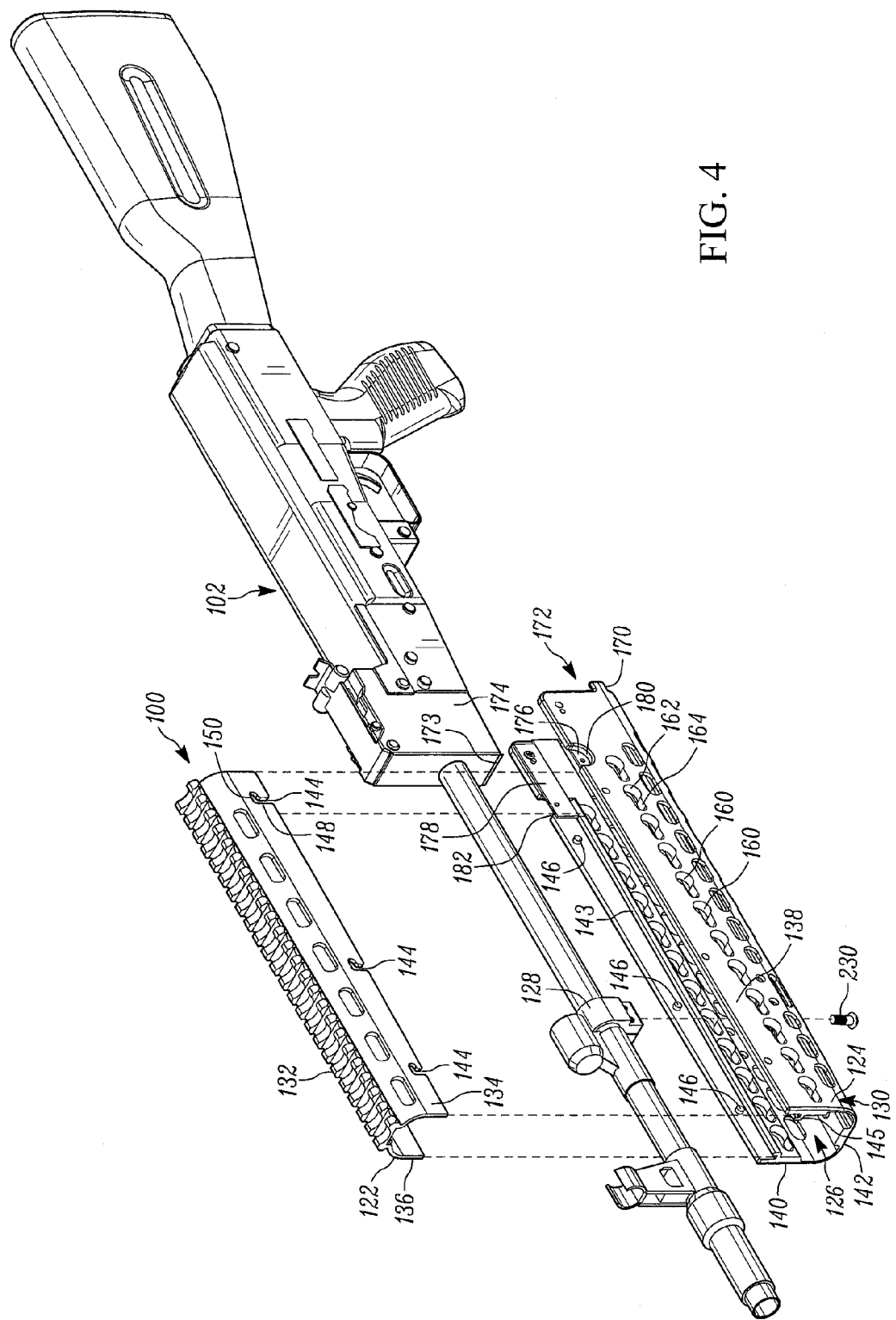
FIG. 4 is an exploded view of another form of a hand guard prior to being installed on a firearm.

Another form of a hand guard 100 is shown in FIG. 4 prior to being assembled on a firearm 102. The hand guard 100 includes a number of similar features and structures as shown and described for the hand guard 20. The hand guard 100 also includes a number of additional and/or different features and structures and may be suitable for use with other firearms. For example, the hand guard 20 may be suitable for use on an AK-47 while the hand guard 100 may be suitable on a Saiga rifle. However, it should be appreciated by one skilled in the art that the features on the hand guards 20 and 100 may be combined, intermixed, swapped and the like to provide a hand guard for a specific firearm. For example, some of the features and structures on hand guard 100 may be configured for use with a hand guard for an AK-47 while features of the hand guard 20 may be configured for use with a Saiga rifle. The hand guards 20,100 may also be configured for use with other firearms, rifles and the like.

As shown in FIG. 4, the hand guard 100 generally includes an upper part 122 and a lower part 124 with the upper and lower parts 122,124 defining an interior space 126 such that the upper and lower parts 122,124 generally surround a barrel of a firearm, when installed.

The hand guard 100 may also include a front securing structure, such as barrel clamp 128 for securing a front portion 130 of the hand guard 100 to a firearm. In one form, as shown in FIG. 4, the hand guard 100 includes a rail interface 132 positioned on the upper part 22. The rail interface 132 may take a variety of forms, such as a dovetail shape, as shown in FIG. 4, whereby accessories, such as a scope, may be positioned and secured thereon.

Figure 5:
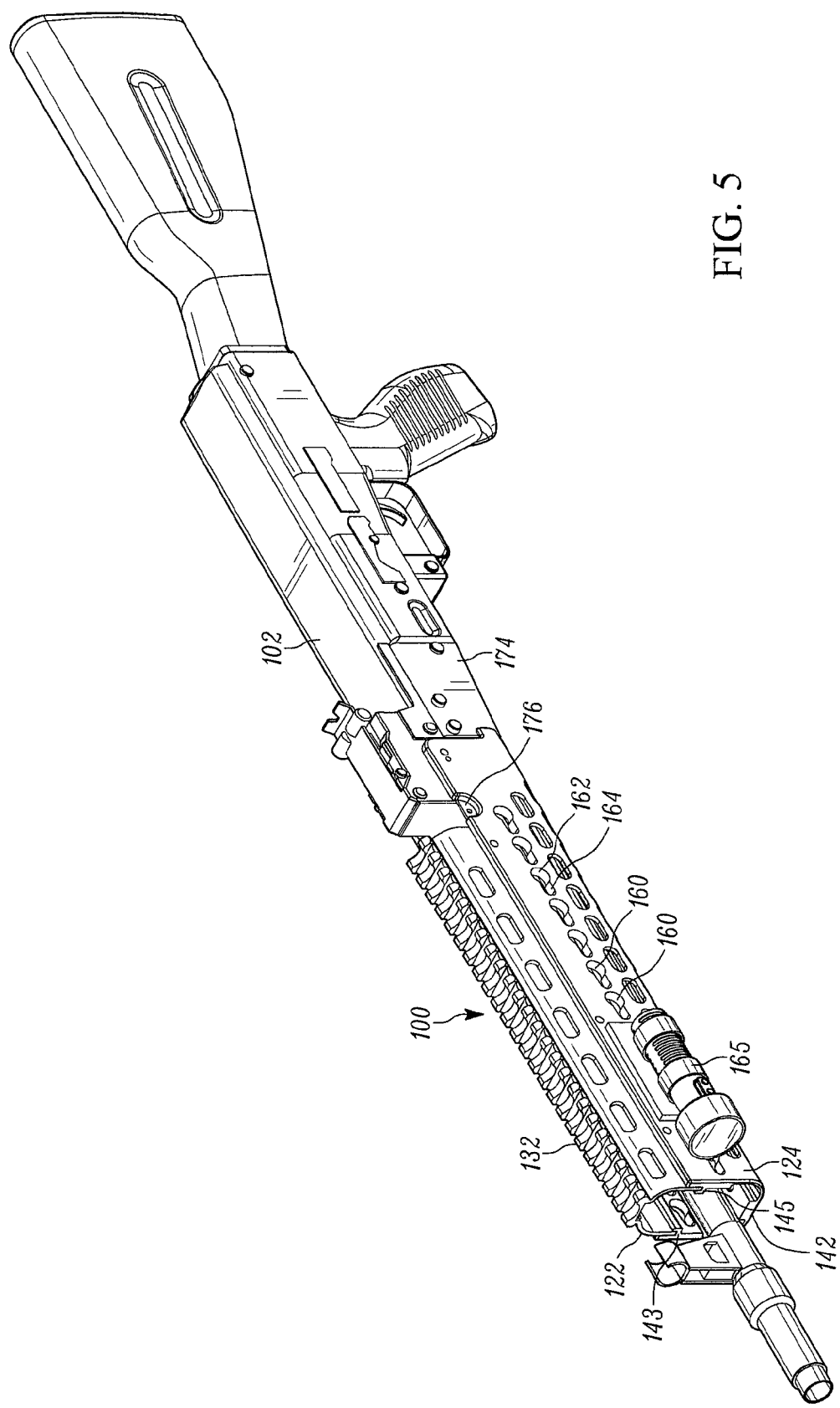
FIG. 5 is a perspective view of the hand guard of FIG. 4 as it is being installed on a firearm.

In one form, the upper part 122 includes sidewalls 134, 136 that extend downwardly from the rail interface 132 while the lower part 124 includes sidewalls 138,140 that extend upwardly from a lower exterior surface 142. In one form, the sidewalls 134,136 are separated by a dimension such that they fit within at least a portion of the dimension between sidewalls 38,40, such as shown in FIGS. 4-5. Further, the lower part 122 includes a first channel 143 and a second channel 145 to receive the sidewalls 134,136 and assist in the assembly and/or securing of the upper and lower parts 122,124 relative to one another. However, it should be understood that the upper and lower parts 122,124 may be configured such that either one may be configured to fit, at least partially, within the other.

The upper and lower parts 122,124 may include a variety of protrusions and slots for coupling the upper and lower parts 122,124 together. For example, in one form, the upper part 122 includes a plurality of slots 144 while the lower part 124 includes a plurality of protrusions 146 that are designed to cooperate with the slots 144 during installation and for securing the upper and lower parts 122,124. In one form, the slots 144 may be generally L-shaped with a generally vertical portion 148 and a generally horizontal portion 150 to permit movement of the slots 144 therein, as will be explained in more detail below.

As seen in FIG. 4, the protrusions 146 generally extend inwardly towards the interior space 126 to cooperate with the slots 144. However, it should be understood that the position and configuration of the slots 144 and protrusions 146 may be modified. For example, the slots 144 may be positioned on the lower part 124 while the protrusions 146 may be positioned on the upper part 122. Further, the protrusions 146 may extend outwardly, such as in the case where the lower part 124 is dimensioned to fit within the upper part 122 (not shown). Other coupling structures are also contemplated as well as placement and configuration of the coupling structures so as to permit the upper and lower parts 122,124 to be removably coupled to one another.

It should be appreciated that while the upper part 122 is shown as being positioned within the lower part 124, the hand guard 100 may also be configured such that the lower part 124 is positioned within the upper part 122. Similarly, the upper and lower parts 122,124 may include any number of different openings and/or structures for securing the upper and lower parts 122,124 relative to one another.

Either and/or both of the upper and lower parts 122,124 may include structures for attaching accessories to the hand guard 100 and firearm. For example, as shown in FIGS. 4 and 5, the lower part 124 includes generally key-shaped openings 160 for receiving accessories and/or accessory mounts. Such key shaped openings 160 include an enlarged portion 162 and a slot portion 164. In one form, the slot portion 164 is generally beveled to receive a beveled portion from an accessory 165. In this regard, the accessory 165 may include an enlarged portion extending from a beveled portion such that the enlarged portion of the accessory is inserted through the enlarged portion 162 and then slid through the slot portion 164. Thereafter, the accessory 165 may be tightened as the beveled portions of the accessory 165 and the slot portion 164 contact one another to secure the accessory. Such a key-shaped opening 160 and accessory mount may be found on products from Noveske and/or Vltor. Other forms of openings, mounts and fastening systems are also contemplated as would be acceptable for use with a hand guard for a firearm.

The hand guard 20 also includes a slot 170 positioned at a rear portion 172 of the hand guard 100. In one form, the slot 170 is positioned in the lower part 124 and is configured to cooperate with a structure, such as a flange 173 on a receiver 174 of a firearm 102, such as shown in FIG. 4. One skilled in the art would understand that such a flange 173 is generally known and understood as used on the receiver 174 of a firearm 102. In this form, the rear portion 172 is supported by the receiver 174 of the firearm. Other mounting structures may also be used.

The hand guard 100 may also include one or more friction fit structures, such as springs 176,178 that can be used to help secure the upper and lower parts 122,124. The springs 176,178 are generally flat springs that are configured to deflect inwardly and/or outwardly, as will be described in more detail below. In one form, the springs 176,178 are secured at one end, such as by rivets, welding, or other fastening techniques. In one form, the springs 176,178 are secured such that they only deflect inwardly and outwardly and do not rotate about the secured point. Further, the springs 176,178 may be manipulated via openings 180,182 in the lower part 124. The springs 176,178 may be positioned adjacent the channels 145,143 to cooperate with the channels 145,143 to retain the upper and lower parts 122, 124 relative to one another as will be understood from the description below of the assembly of the hand guard 100. It should be appreciated that other springs and other friction fit structures may also be utilized. Additionally, the springs 176,178 may be positioned in other locations on the lower part 124 as well as on the upper part 122.

Figure 8:
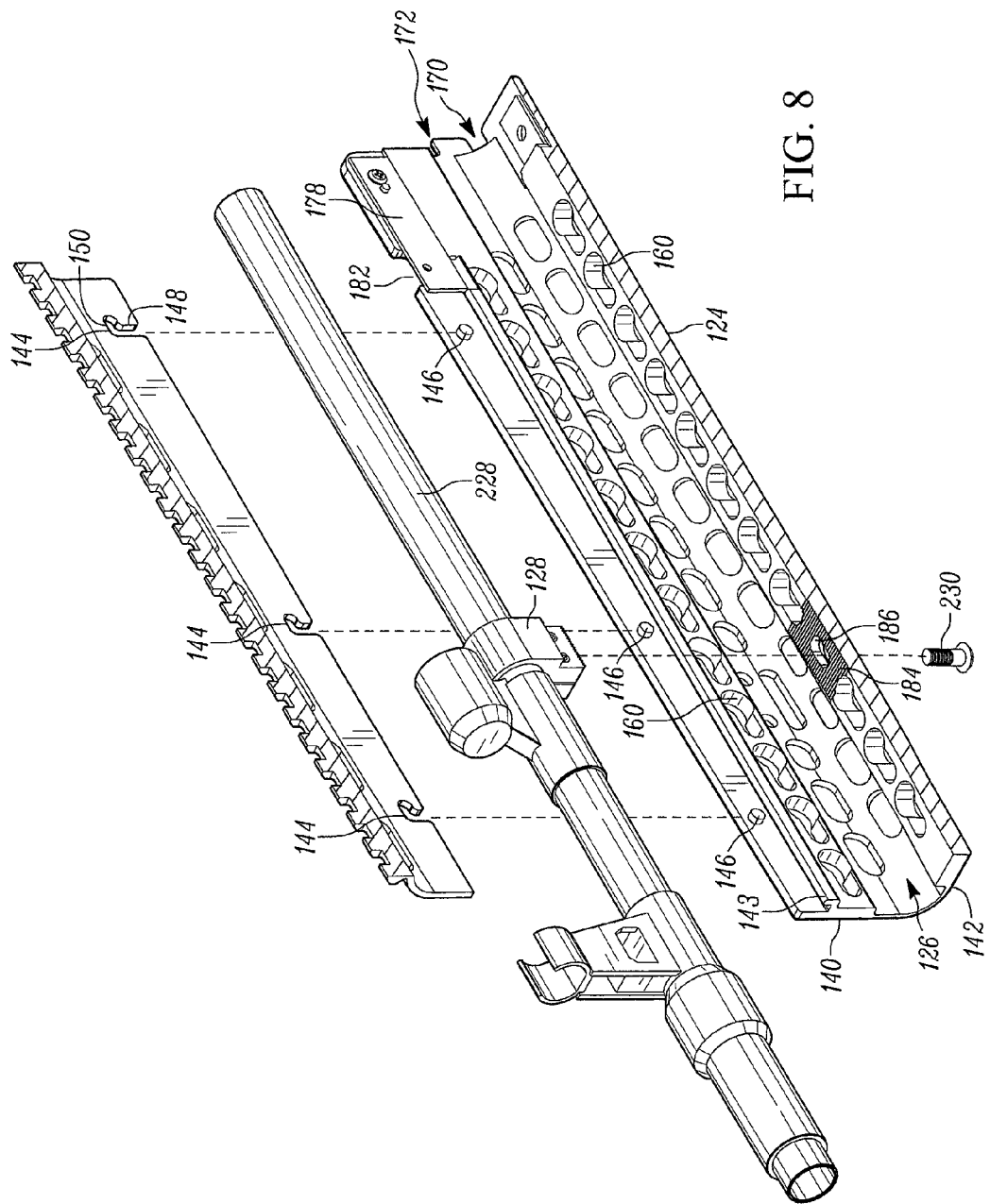
FIG. 8 is a partial cross-sectional view of a hand guard as it is being installed with the barrel clamp of FIG. 6.

The hand guard 100 may also include a toothed portion 184. As shown in FIG. 8, the toothed portion 184 may be positioned on the lower part 124 and directed inwardly towards the interior 126. The toothed portion 184 may also be located and positioned elsewhere on the hand guard 100.

The toothed portion 184 also includes an opening 186. Generally, the toothed portion 184 is configured to cooperate with the barrel clamp 128, such as will be described in more detail below.

Figure 6:
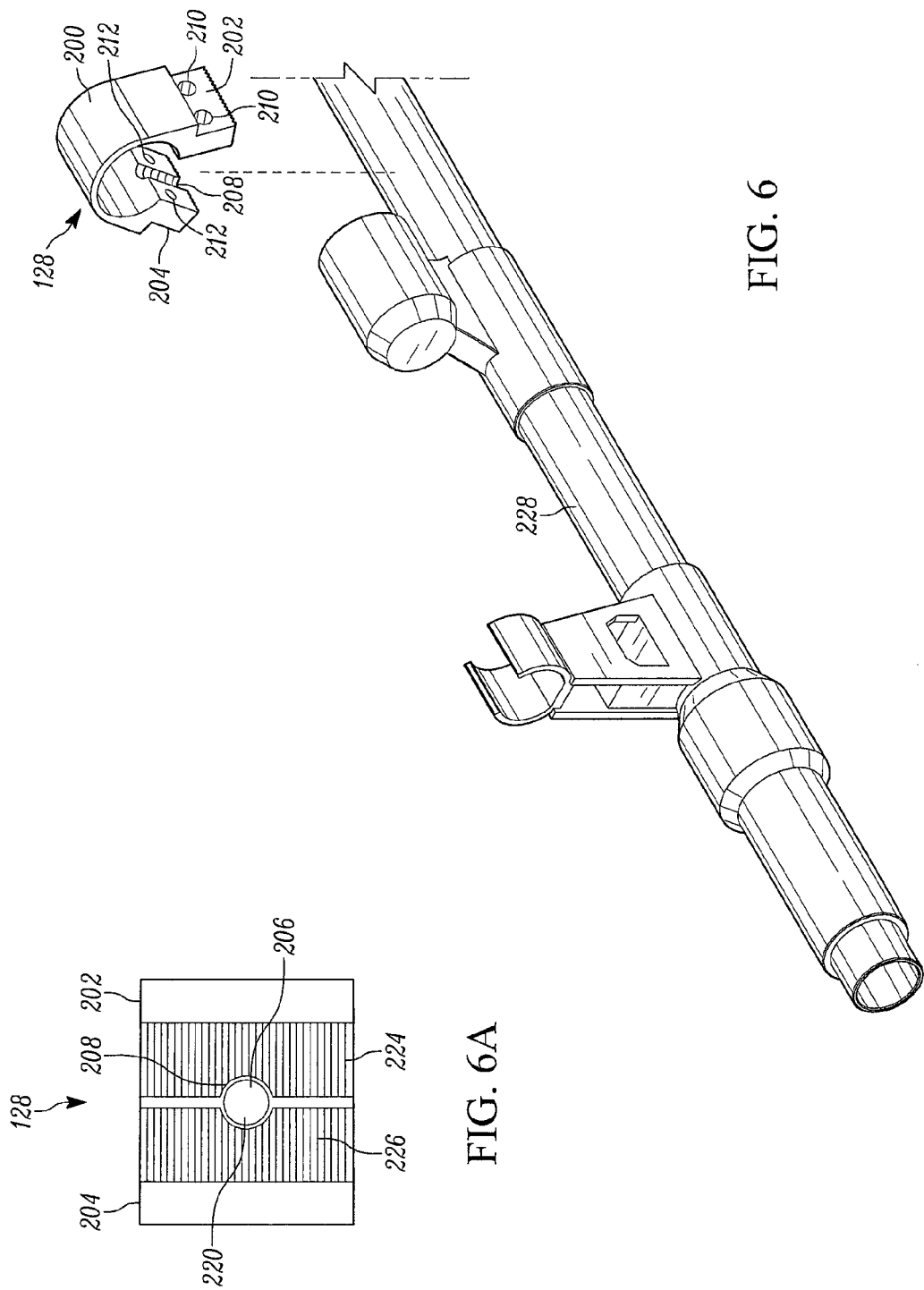
FIG. 6 is a perspective view of a barrel clamp prior to being installed on a firearm.
Figure 7:
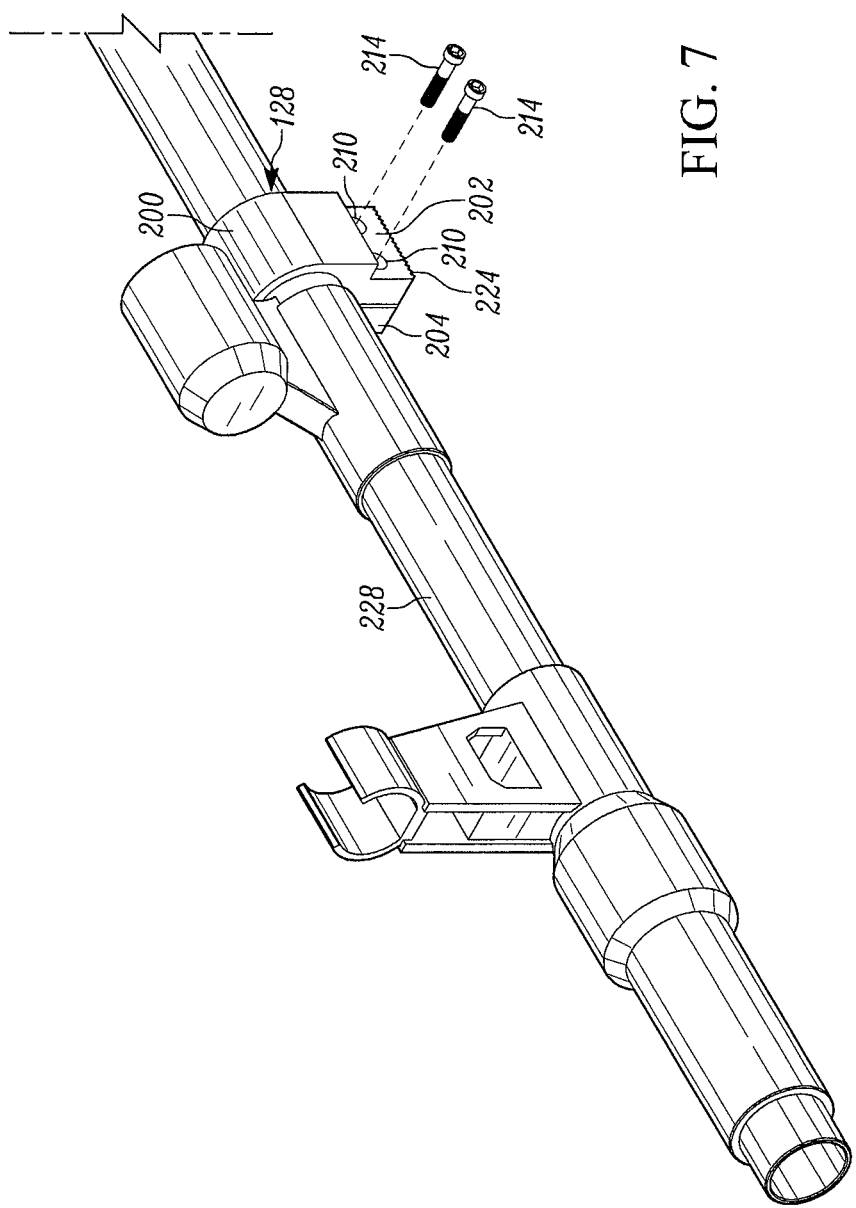
FIG. 7 is a perspective view of the barrel clamp of FIG. 6 as it is being installed on a firearm.

The barrel clamp 128 may be configured to be coupled to a barrel of a firearm and also secure the hand guard 100. The barrel clamp 128 may include a barrel engaging portion 200, a first housing engaging portion 202 and a second housing engaging portion 204. The first housing engaging portion 202 includes a first partially threaded portion 206 while the second housing engaging portion 204 includes a second partially threaded portion 208. The barrel engaging portion 200 generally extends between the first and second housing engaging portions 202,204. As shown in FIG. 6, prior to installation, the first and second housing engaging portions 202,204 are separated from one another in an open configuration. The first and second housing engaging portions 202,204 can be moved to an installed configuration, such as shown in FIG. 6A, whereby the first and second housing engaging portions 202,204 are positioned adjacent one another.

The barrel clamp 128 also includes a plurality of openings 210,212, such as located on the first and second housing engaging portions 202,204 and as best seen in FIG. 6. The openings 210,212 are configured to cooperate with fasteners, such as screws 214 to maintain the barrel clamp in the installed configuration. When in the installed configuration, the first and second housing engaging portions are positioned adjacent one another such that the first and second partially threaded portions 206,208 to define a threaded opening 220 extending in a first direction which is configured to receive a fastener. When installed, the barrel clamp engaging portion 200 substantially surrounds a circumference of a barrel of a firearm. Furthermore, the first and second housing engaging portions 202,204 may include a first and second plurality of aligned teeth 224,226.

The installation and use of the barrel clamp 128 and the hand guard 100 will be explained in more detail. The barrel clamp 128 is generally configured to start in the open configuration, as shown in FIG. 6 such that the first and second housing engaging portions 202,204 may be sufficiently separated to be slid over the diameter of a barrel 228 of a firearm. After the barrel clamp 128 is positioned around the barrel 228, the first and second housing engaging portions 202,204 may be brought together, such as through the use of a vise. Next, fasteners 214 may be positioned through the openings 210,212 to maintain the position of the barrel clamp 128 on the barrel 228 at a desired position. In this configuration, the opening 220 is configured to receive a fastener to secure the hand guard 100 to the barrel clamp 128. The barrel clamp 128 may be installed prior to or concurrent with the hand guard 100

The lower part 124 may be installed on the firearm 102 in a similar manner as that described for hand guard 20. More specifically, the lower part 124 may first be positioned on the firearm 102 whereby the slot 170 is positioned to couple with the flange 172 on the receiver 174 to secure the rear portion 172 of the hand guard 100. Next, the toothed portion 184 is brought into alignment and contact with the first and second aligned teeth 224,226 of the barrel clamp 128. Further, the opening 186 is aligned with opening 220 whereby a fastener 230 may be used to secure the lower part 124 to the barrel clamp 128, such as shown in FIG. 8. In this form, the lower part 124 is generally secured to the firearm 102 via the flange 173 and the barrel clamp 128. Further, the aligned teeth 224,226 and toothed portion 184 help maintain the position of the lower part 124 as the barrel clamp is secured to the barrel 228.

Figure 9A:
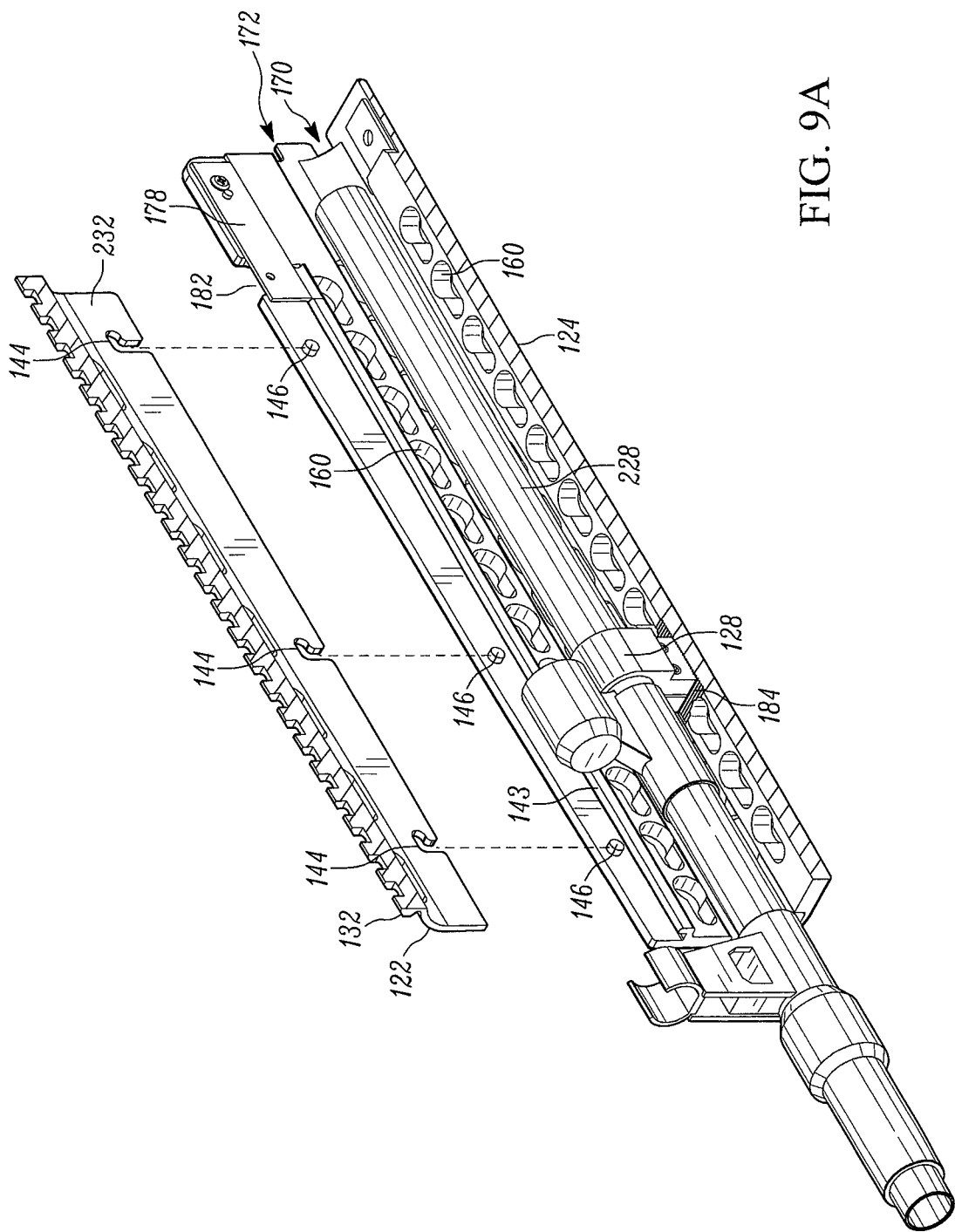
FIG. 9A is a partial cross-sectional view of the lower part of a hand guard coupled to a barrel clamp.
Figure 9B:
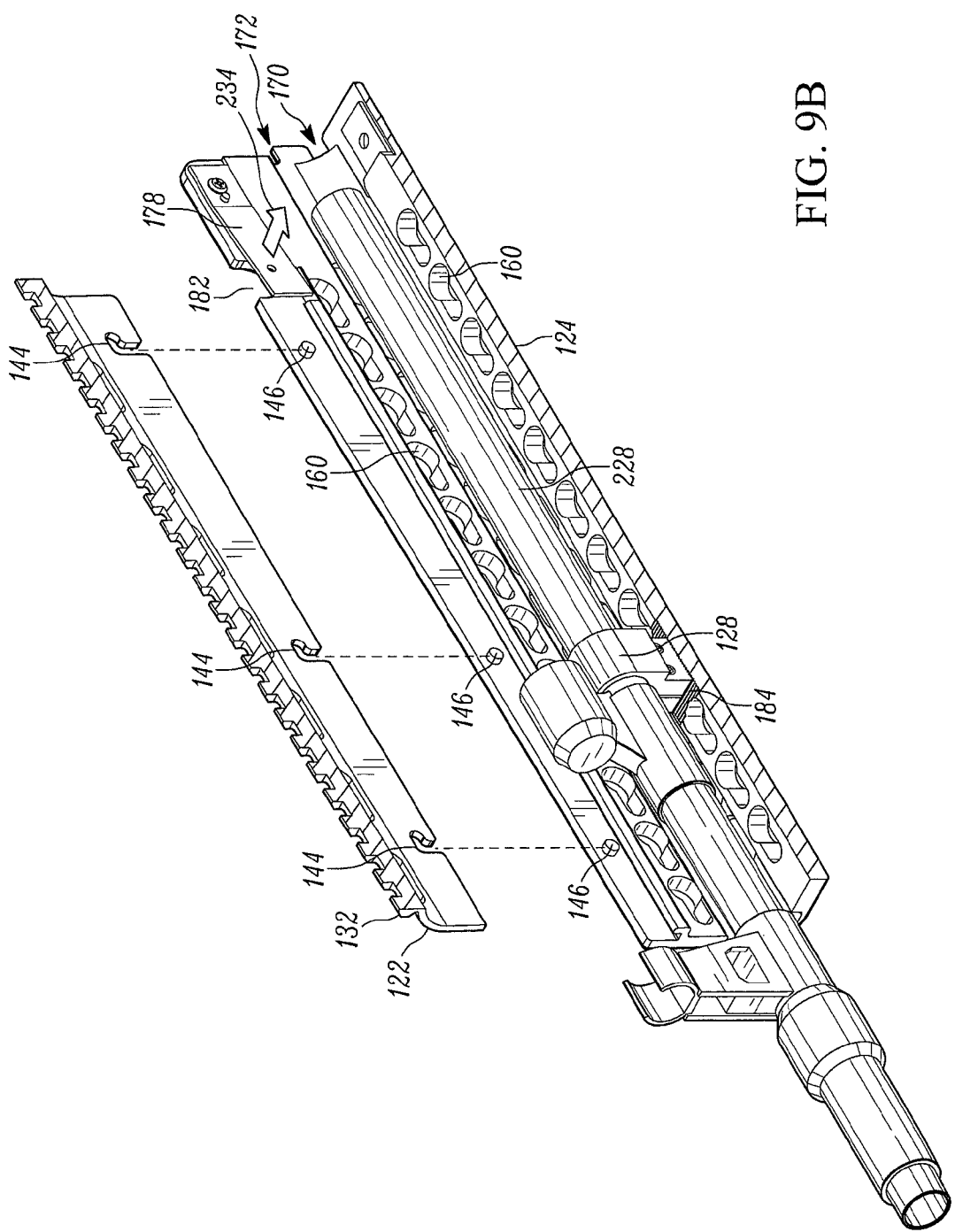
FIG. 9B is a partial cross-sectional view of the upper part being positioned with the lower part of the hand guard of FIG. 9A.
Figure 9C:
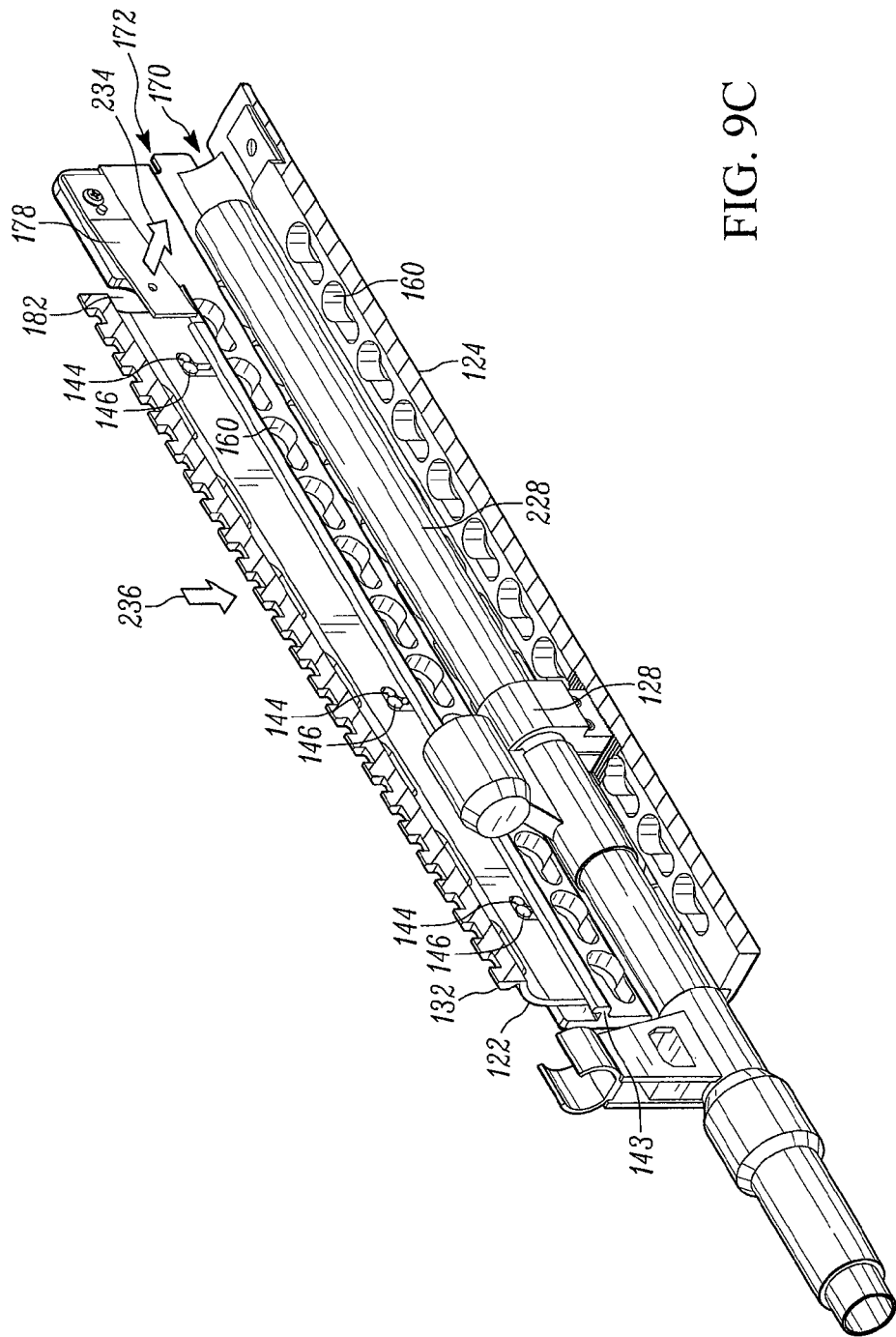
FIG. 9C is a partial cross-sectional view showing a spring deflecting inwardly to permit the upper part of the hand guard to be positioned within the lower part of the hand guard of FIG. 9A.
Figure 9D:
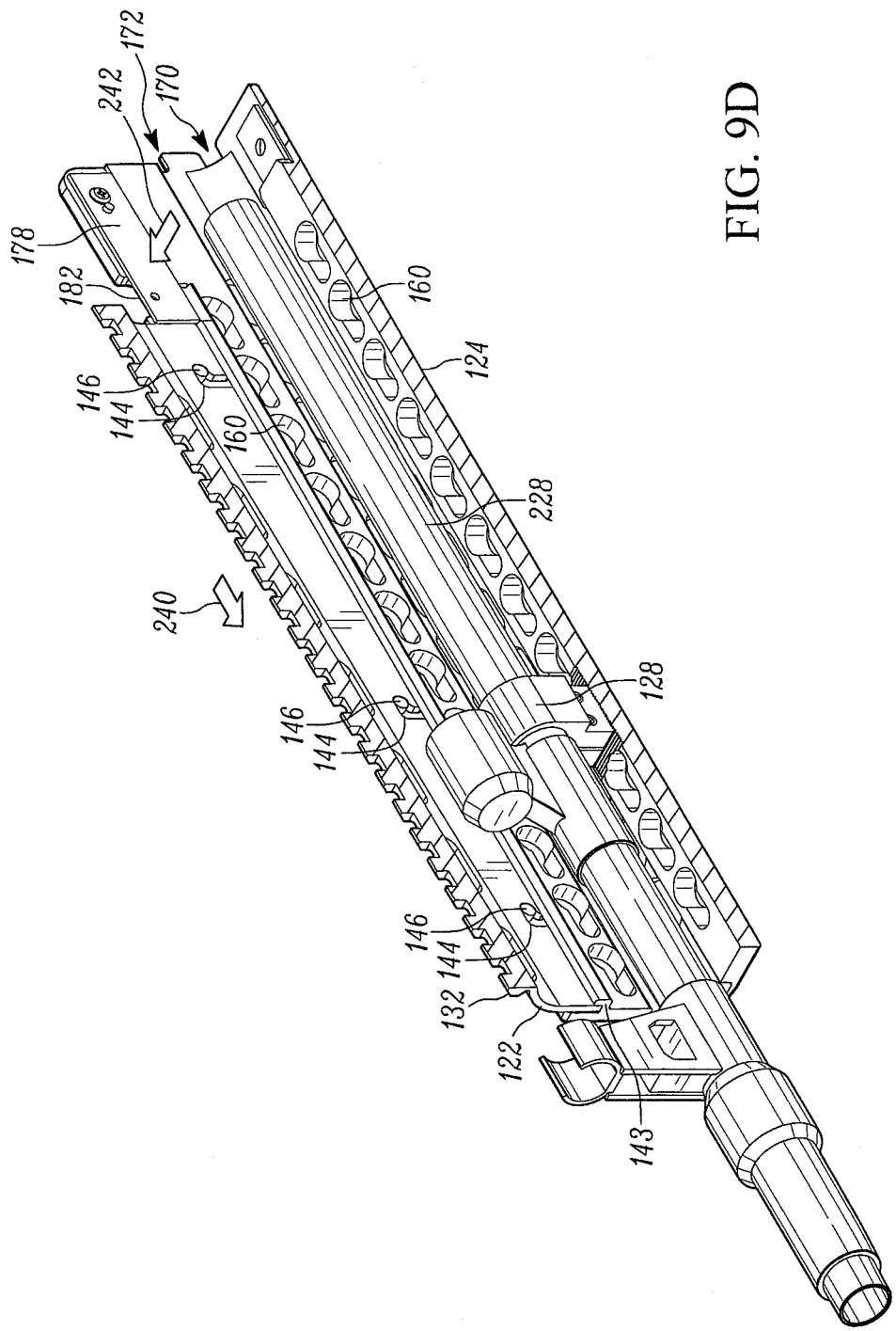
FIG. 9D is a partial cross-sectional view showing the upper part of the hand guard sliding forward to an installed configuration relative to the lower part of the hand guard of FIG. 9A.

After the barrel clamp 128 and lower part 124 are secured to the firearm 102, the upper part 122 may be positioned on the lower part. The upper part 122 is coupled to the lower part as shown in the progression of FIGS. 9A-D. As shown in FIG. 9A, the slots 144 are generally brought into engagement to couple with the protrusions 146. However, the rearmost portion 232 of the upper part 122 will not be able to fully engage the lower part 124 as the springs 176,178 interfere. To permit the upper part 122 to fully engage and permit all slots 144 to engage all protrusions 146, the springs 176,178 must deflect inwardly toward the interior space 126, as shown by arrow 234 in FIG. 9B for spring 178. Spring 176 will deflect in an opposite direction, but still outwardly relative to the interior space 126.

After the springs 176,178 have been deflected inwardly, the rearmost portion 232 of the upper part 122 may drop down into engagement with the lower part 124, as shown by arrow 236. In this regard, the sidewalls 134,136 may be positioned within the channels 145,143. Further, the springs 176,178 are positioned inwardly relative to the sidewalls 134,136.

Finally, the upper part 122 may be moved forward, in a direction indicated by arrow 240, whereby the springs 176,178 may then extend outwardly, such as shown by arrow 242 for spring 178. Spring 176 will deflect in an opposite direction, but still outwardly relative to the interior space 126. Once the springs 176,178 have deflected back to the original positions, such as shown in FIG. 4, the springs 176,178 will generally abut the rearmost portion 232 of the upper part 122. This will cooperate with the slots 144, protrusions 146 and channels 145,143 to substantially maintain the upper part 122 in the same position relative to the lower part 124.

The hand guard 100 may generally be configured to permit the hand guard 100 to be at least partially removed and then reinstalled so that the relative position of the hand guard is maintained in the same position as initially installed. In this regard, any accessories mounted to the hand guard 100 can maintain their "zero." For example, a scope (not shown) mounted to the upper part 122 can maintain its zero even if the upper part 122 is removed from the lower part 124, such as would be done to replace or maintain a gas tube (not shown) on a firearm. Further, because of the structures used to couple the hand guard 100 to the firearm, as well as the upper and lower parts 122,124 to one another, the hand guard 100 may generally maintain the zero of attached accessories when the firearm is used and transported. For example, the teeth help maintain the position of the barrel clamp and hand guard while the protrusions, slots, channels and springs help maintain the position of the upper and lower parts, even in view of recoil as well as other forces associated with transporting the firearm.

The hand guard may be manufactured from a variety of materials, such as would be understood by those skilled in the art. For example, the barrel clamp and hand guard may be made from materials including, but not limited to metals, alloys, polymers, carbon fiber, plastics, and other suitable materials. In one form, the barrel clamp and hand guard may be manufactured from aluminum and/or steel.

While the invention has been particularly described with specific reference to particular structural and functional embodiments, it will be appreciated that various alterations, modifications and adaptions may be based on the present disclosure, and are intended to be within the spirit and scope of the present application as defined by the following claims. For instance, while the present application has been exemplified with respect to certain forms of firearms, it will be appreciated that the application is generally applicable to any type of firearm, such as a rifle, and may include any and/or all of the features and structures from any of the embodiments described herein.

What is claimed is:

1. A hand guard for a firearm comprising:
   an elongated housing comprising an upper part, a lower part and a locking structure, the upper and lower parts defining an interior space,
   one of the upper and lower parts having an interior portion with a first dimension that is sized to be received within the other of the upper and lower parts at an exterior portion having a second dimension larger than the first dimension,
   at least one of the upper and lower parts including a protrusion extending toward the interior portion while the other of the upper and lower parts defining a slot configured to accept the protrusion, the slot being generally L-shaped to receive the protrusion and permit the upper and lower portions to move in a plurality of directions relative to one another,
   the locking structure abutting the interior portion and cooperating with the protrusion and slot to limit movement of the upper and lower parts relative to one another when in an installed configuration,
   the locking structure being movable to an unlocked position thereby permitting the upper and lower parts to move relative to one another and disengage the protrusion from the slot.

2. The hand guard of claim 1 further comprising a barrel clamp configured to secure the hand guard to the firearm.

3. The hand guard of claim 1 further comprising a first channel positioned at a wall of the exterior portion configured to receive a wall of the interior portion and a second channel positioned at an opposing wall of the exterior portion configured to receive an opposing wall of the interior portion, the first and second channels defining the second dimension.

4. The hand guard of claim 3 wherein the locking structure includes a first spring positioned at the first channel and a second spring positioned at the second channel, and the first and second springs deflect towards the interior space to permit the interior portion to be secured within the exterior portion.

5. The hand guard of claim 1 wherein the exterior portion includes a plurality of protrusions and the interior portion includes a plurality of slots configured to receive the plurality of protrusions.

6. The hand guard of claim 1 wherein the locking structure includes at least one spring that deflects towards the interior space in the unlocked position.

7. The hand guard of claim 1 wherein at least one of the upper and lower parts includes a plurality of external openings configured to receive and secure at least one firearm accessory.

8. A hand guard for a firearm comprising:
   an elongated housing comprising an upper part, a lower part and a locking structure, the upper and lower parts defining an interior space,
   one of the upper and lower parts having an interior portion with a first dimension that is sized to be received within the other of the upper and lower parts at an exterior portion having a second dimension larger than the first dimension,
   at least one of the upper and lower parts including a protrusion extending toward the interior portion while the other of the upper and lower parts defining a slot configured to accept the protrusion,
   the locking structure abutting the interior portion and cooperating with the protrusion and slot to limit movement of the upper and lower parts relative to one another when in an installed configuration,
   the locking structure being movable to an unlocked position thereby permitting the upper and lower parts to move relative to one another and disengage the protrusion from the slot; and
   a barrel clamp including a barrel engaging portion, a first housing engaging portion and a second housing engaging portion,
   the barrel engaging portion extending between the first housing engaging portion and the second housing engaging portion,
   the first and second housing engaging portions each including a partially threaded portion such that when the first and second housing engaging portions are positioned adjacent one another the partially threaded portions define a threaded opening extending in a first direction for receiving a fastener,
   the barrel clamp extending from the firearm and being operably coupled at least one of the upper and lower parts via a fastener extending into the threaded opening when in the installed configuration.

9. The hand guard of claim 8 further comprising a barrel clamp configured to secure the hand guard to the firearm.

10. The hand guard of claim 8 further comprising a first channel positioned at a wall of the exterior portion configured to receive a wall of the interior portion and a second channel positioned at an opposing wall of the exterior portion configured to receive an opposing wall of the interior portion, the first and second channels defining the second dimension.

11. The hand guard of claim 10 wherein the locking structure includes a first spring positioned at the first channel and a second spring positioned at the second channel, and the first and second springs deflect towards the interior space to permit the interior portion to be secured within the exterior portion.

12. The hand guard of claim 8 wherein the exterior portion includes a plurality of protrusions and the interior portion includes a plurality of slots configured to receive the plurality of protrusions.

13. The hand guard of claim 8 wherein the slot is generally L-shaped to receive the protrusion and permit the upper and lower portions to move in a plurality of directions relative to one another.

14. The hand guard of claim 8 wherein the locking structure includes at least one spring that deflects towards the interior space in the unlocked position.

15. The hand guard of claim 8 wherein one of the upper and lower parts includes a toothed portion, the first housing engaging portion includes an upper portion having a first plurality of aligned teeth and the second housing engaging portion includes an upper portion having a second plurality of aligned teeth, the first and second plurality of aligned teeth being in alignment with one another when the first and second housing engaging portions are positioned adjacent one another and configured to cooperate with the toothed portion.

16. The hand guard of claim 8 further comprising a first opening extending through the first housing engaging portion and a second opening extending through the second housing engaging portion, the first and second openings aligning with one another when the first and second openings are positioned adjacent one another to permit a fastener to pass therethrough in a direction that is substantially perpendicular to the first direction of the threaded opening.

17. The hand guard of claim 8 wherein at least one of the upper and lower parts includes a plurality of external openings configured to receive and secure at least one firearm accessory.

18. A hand guard for a firearm comprising:
- an elongated housing comprising an upper part, a lower part and a locking structure, the upper and lower parts defining an interior space,
- one of the upper and lower parts having an interior portion with a first dimension that is sized to be received within the other of the upper and lower parts at an exterior portion having a second dimension larger than the first dimension,
- at least one of the upper and lower parts including a protrusion extending toward the interior portion while the other of the upper and lower parts defining a slot configured to accept the protrusion,
- the locking structure abutting the interior portion and cooperating with the protrusion and slot to limit movement of the upper and lower parts relative to one another when in an installed configuration,
- the locking structure being movable inwardly towards the interior space to an unlocked position thereby permitting the upper and lower parts to move relative to one another and disengage the protrusion from the slot.

* * * * *